(12) United States Patent
Griebling

(10) Patent No.: US 6,446,579 B1
(45) Date of Patent: Sep. 10, 2002

(54) ANIMAL RESTRAINING DEVICE

(75) Inventor: Cheryl Ann Griebling, Fort Dodge, IA (US)

(73) Assignee: Wyeth, Madison, NJ (US)

( * ) Notice: Subject to any disclaimer, the term of this patent is extended or adjusted under 35 U.S.C. 154(b) by 0 days.

(21) Appl. No.: 09/945,860

(22) Filed: Sep. 4, 2001

(51) Int. Cl.$^7$ .............................................. A01K 15/04
(52) U.S. Cl. ....................................................... 119/751
(58) Field of Search ................................. 119/751, 714, 119/717, 725, 729, 732, 753, 755, 756, 761, 792, 809, 814, 712, 816, 817

(56) References Cited

U.S. PATENT DOCUMENTS

| | | | |
|---|---|---|---|
| 2,319,938 A | * | 5/1943 | Markins ..................... 119/714 |
| 2,540,650 A | | 2/1951 | Brosene, Jr. et al. |
| 3,474,763 A | | 10/1969 | Kissil et al. |
| 3,625,185 A | * | 12/1971 | Kester ......................... 119/58 |
| 3,739,751 A | | 6/1973 | Mohr et al. |
| 4,137,870 A | | 2/1979 | Cano |
| 5,167,160 A | | 12/1992 | Hall, II |
| 5,230,304 A | | 7/1993 | Santoro |
| 5,320,069 A | | 6/1994 | Anderson, Jr. et al. |
| 5,816,197 A | | 10/1998 | DeStefano et al. |
| 5,839,393 A | | 11/1998 | Rupp et al. |
| 5,927,234 A | | 7/1999 | Siegel |
| 5,975,028 A | * | 11/1999 | Wetmore ..................... 119/814 |

* cited by examiner

Primary Examiner—Charles T. Jordan
Assistant Examiner—Danielle Rosenthal
(74) Attorney, Agent, or Firm—Joseph M. Mazzarese

(57) ABSTRACT

An animal restraining device which includes a rigid, cylindrically-shaped, hollow tube open at both ends and having a longitudinal slit from one end to the other end. The device also includes a base and a tab. The tube is attached to the base to keep it stationary. The tab is attached at one end of the tube and provides a surface for placing the tail of an animal. The animal may be placed in the tube backwards, with its tail in the slit, and backed in toward the tab. The tube is sized to admit the animal without allowing excess space for movement. This invention is useful for conveniently and efficiently restraining an animal that is to be given a dose of medicine or the like, particularly when an injection must be administered to the animal.

6 Claims, 1 Drawing Sheet

ANIMAL RESTRAINING DEVICE

BACKGROUND OF THE INVENTION

Animals frequently need to be restrained to facilitate medical treatment or during research procedures, such as when the animal is to receive an injection. In a research setting, it is desirable to have a restraining device that allows animals to be processed quickly and efficiently.

U.S. Pat. No. 5,927,234 discloses an animal restraining device comprising a tube having at least one opening to allow an animal to enter the interior of the tube.

U.S. Pat. No. 5,816,197 teaches an injection shield for protecting a person's hand while injecting a rodent. This device comprises a frame which includes a coupler for receiving and releasable securing a restrainer in a desirable orientation.

U.S. Pat. No. 5,230,304 describes an animal treatment and handling device which is a flexible enclosure.

U.S. Pat. No. 5,320,069 discloses a small animal restraint device comprising a cylinder having a longitudinal slot in the wall thereof, and a conical member attached to one end of the cylinder.

U.S. Pat. No. 3,739,751 teaches a restrainer and metabolism cage comprising several sections which define a cylindrical cavity.

U.S. Pat. No. 2,540,650 describes an animal holder comprising a cylinder and a cap or light baffling device.

SUMMARY OF THE INVENTION

The present invention is an animal restraining device comprising:

a) a rigid cylindrically-shaped tube comprising a curved wall having an exterior surface and an interior surface, said tube having an interior chamber within said wall, a first end and a second end which ends are both open to provide access to the chamber from the outside, and a longitudinal slit through a first side of said wall extending from said first end to said second end and providing access to the interior chamber from the outside;

b) a solid base securely attached to said exterior surface of said wall on a second side thereof which is approximately diametrically opposite said first side; and, c) a tab securely attached to said second side of said tube at said first end thereof, said tab extending from said second side toward said first side to a point between said first side and said second side and further extending from said point away from said tube in a direction approximately parallel to the longitudinal axis of said cylindrically-shaped tube.

In a preferred method of using the present invention, an animal having a tail is backed into the second end of the tube with its tail in the slit until the tail rests on the tab located at the first end of the tube. If necessary, the tail may be held against the tab to further restrain the animal. The animal may then be readily inspected or treated; for example, it conveniently may be given an injection near or in the tail.

DETAILED DESCRIPTION

Figure 1:
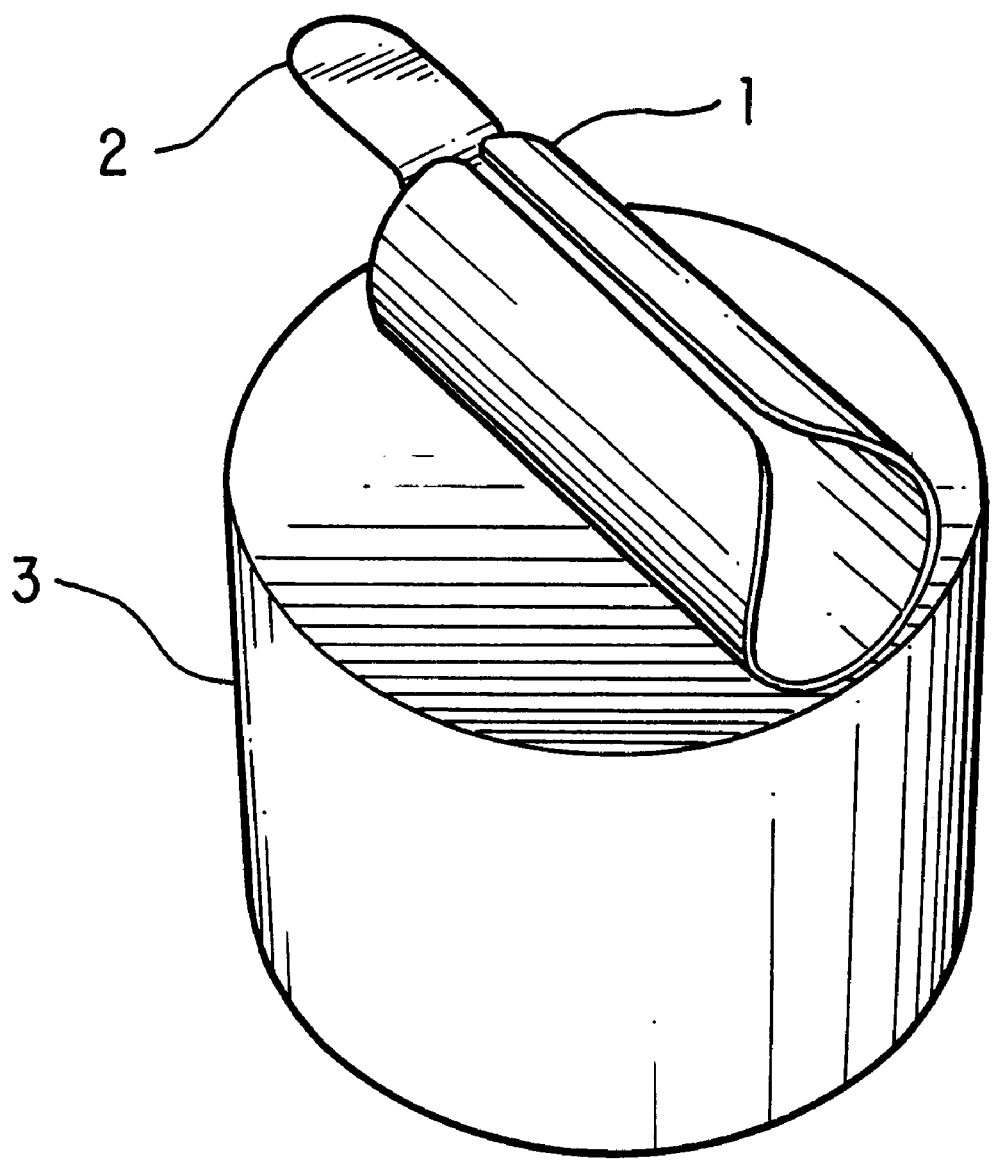
FIG. 1 depicts an embodiment of the present invention in which a slit tube 1 is secured to a base 3 on a side diametrically opposite to the slit, and a tab 2 is attached to one end of the tube 1.

The present invention is suitable for restraining a variety of animals, particularly four-legged animals having tails. The dimensions of the tube should be chosen to provide an interior chamber that will hold the animal to be restrained without allowing excess room for movement. It is desirable to select a base having sufficient mass to provide stability, so that the device will not tilt or wobble even when the animal is contained therein.

In use, it is contemplated that an animal will enter the second end of the tube backwards and its tail will be pulled through the slit to the tab. The tail may be held against the tab to fix the animal in place.

The tube of this invention should be made sturdy enough to hold the animal securely, and should have appropriate dimensions to provide an open end and an inner chamber capable of admitting the animal into the chamber without allowing the animal sufficient room to move about significantly while inside the chamber. The animal, will, therefore, be restrained from moving while within the device, especially if the animal's tail is held in place against the tab. The slit should be wide enough to easily slide the tail though from one end of the tube to the other end, but not so wide as to permit the animal's body to pass through it. Those skilled in the art will readily be able to design an appropriate tube for any animal to be restrained.

The shape of the base is not critical, as long as the base serves to fix the tube firmly in place. The tube and the base may be attached by any suitable means, e.g., welding, soldering, bolting, gluing, and the like. The tab may also be attached to the tube by any suitable means. It is also within the scope of the invention that two, or all three, of these elements, are made out of a single piece of material, for example, a one-piece molded steel or plastic device.

As used in this specification, the statement that the tab is attached to the wall of the tube includes the possibility that such attachment is by means of the base, i.e., that the tube and tab are attached to the base rather than directly to each other, provided that the tab is positioned at the end of the tube as described herein. The tab preferably is bent, extending across the opening at the first end of the tube so that it partly blocks the first end of the tube but leaves room for the animal's tail to protrude through the first end of the tube, and then bending in a direction away from the tube to provide a surface on which the animal's tail may be rested or held. It is within the scope of the invention to have a tab that is in two or more parts joined together, rather than one bent piece of material, but a one-piece tab is preferred.

In a preferred embodiment of the present invention, the device is a stainless steel mouse restrainer. Referring to FIG. 1, a mouse may be placed into the tube 1 backwards with its tail in the slit of the tube 1 until the mouse's tail rests on the tab 2. The base 3 provides stability.

The device of the present invention may be made out of any material or combination of materials known in the art which provide sufficient rigidity and strength to restrain the animal of interest. Those skilled in the art will be able to determine which materials are suitable without undue experimentation.

The animal restrainer of this invention may be scaled up or down, and the relative proportions of the tube and other elements may be varied, to make a device that is useful to restrain virtually any animal of any size. Although the device of the present invention is particularly useful for restraining smaller animals that can be placed in the device by hand, e.g., mice, those skilled in the art will understand that it may be adapted to be used on larger animals. The device may also be used on very small animals, such as certain insects.

Preferably, the present invention is designed to restrain, mice, rodents, and other small four-legged animals having a prominent tail. This invention will be very useful for restraining laboratory mice, hamsters, and like animals, especially where efficient and rapid processing is needed due to the large number of animals to be processed. This invention is well designed to restrain an animal while it is being given an injection; however, it is not solely limited to this use. Those skilled in the art will find many circumstances in which the present invention will be helpful in restraining an animal.

Many variations of the present invention not illustrated or described herein will occur to those skilled in the art. The present invention is not limited to the embodiments illustrate and described herein, but encompasses all the subject matter within the scope of the appended claims and equivalents thereof.

What is claimed is:

1. An animal restraining device comprising:
   a) a rigid cylindrically-shaped tube comprising a curved wall having an exterior surface and an interior surface, said tube having an interior chamber within said wall, a first end and a second end which ends are both open to provide access to the chamber from the outside, and a longitudinal slit through a first side of said wall extending from said first end to said second end and providing access to the interior chamber from the outside;
   b) a solid base securely attached to said exterior surface of said wall on a second side thereof which second side is approximately diametrically opposite said first side; and,
   c) a tab securely attached to said second side of said tube at said first end thereof, said tab extending from said second side toward said first side to a point between said first side and said second side and further extending from said point away from said tube in a direction approximately parallel to the longitudinal axis of said cylindrically-shaped tube.

2. An animal restraining device according to claim 1 wherein the device consists essentially of a metal or metal alloy.

3. An animal restraining device according to claim 2 wherein said metal or metal alloy is stainless steel.

4. A mouse restraining device comprising:
   a) a rigid cylindrically-shaped tube comprising a curved wall having an exterior surface and an interior surface, said tube having an interior chamber within said wall, a first end and a second end which ends are both open to provide access to the chamber from the outside, and a longitudinal slit through a first side of said wall extending from said first end to said second end and providing access to the interior chamber from the outside;
   b) a solid base securely attached to said exterior surface of said wall on a second side thereof which second side is approximately diametrically opposite said first side; and,
   c) a tab securely attached to said second side of said tube at said first end thereof, said tab extending from said second side toward said first side to a point between said first side and said second side and further extending from said point away from said tube in a direction approximately parallel to the longitudinal axis of said cylindrically-shaped tube.

5. An animal restraining device according to claim 4 wherein the device consists essentially of a metal or metal alloy.

6. An animal restraining device according to claim 5 wherein said metal or metal alloy is stainless steel.

* * * * *